US006324635B1

United States Patent
Van Dyke et al.

(10) Patent No.: US 6,324,635 B1
(45) Date of Patent: Nov. 27, 2001

(54) METHOD AND APPARATUS FOR ADDRESS PAGING EMULATION

(75) Inventors: Korbin S. Van Dyke, Sunol; Paul W. Campbell, Oakland, both of CA (US)

(73) Assignee: ATI International SRL (KN)

( * ) Notice: Subject to any disclaimer, the term of this patent is extended or adjusted under 35 U.S.C. 154(b) by 0 days.

(21) Appl. No.: 09/328,332

(22) Filed: Jun. 9, 1999

(51) Int. Cl.[7] .................................................. G06F 12/10
(52) U.S. Cl. ............................................................. 711/207
(58) Field of Search ............................................ 711/207

(56) References Cited

U.S. PATENT DOCUMENTS 6,038,661 * 3/2000 Yoshioka et al. ..................... 712/244

* cited by examiner

*Primary Examiner*—Jack A. Lane
(74) *Attorney, Agent, or Firm*—Vedder, Price, Kaufman & Kammholz (57) ABSTRACT

A method and apparatus for address paging emulation includes processing that begins by producing an extended logical address in response to a memory access request. The extended logical address includes a logical address and an address extension. The processing then continues by determining whether an entry exists for the memory access request in a translation look aside table. Such a determination is based on the logical address. When an entry does not exists for the memory access request, the process continues by providing the extended logical address to a plurality of exception handlers. The exception handlers interpret the address extension to identify one of the exception handlers to process the extended logical address. The exception handlers include a page exception handler, a non-page exception handler, a native processor exception handler, and a page directory entry exception handler.

19 Claims, 7 Drawing Sheets

METHOD AND APPARATUS FOR ADDRESS PAGING EMULATION

TECHNICAL FIELD OF THE INVENTION

This invention relates generally to computers and more particularly to restricting access to particular locations in system memory space and to address paging simulation for addressing memory.

BACKGROUND OF THE INVENTION

Computers are known to include a central processing unit, system memory, a memory controller, video graphics circuitry, a chip set, and peripheral ports. The peripheral ports enable the central processing unit, and video graphics circuitry, to communicate data with peripheral devices such as monitors, printers, external memory, the Internet, etc.

As is known, the system memory space is divided into two sections, one for use by the central processing unit and the other section for use by peripheral devices via a peripheral bus. Such a peripheral bus may be a PCI bus or accelerated graphics port (AGP). In either case, a programmer may write code that utilizes these memory sections on behalf of central processing unit, the peripheral devices, and/or the video graphics processor.

To improve memory access, the central processing unit, and other peripheral devices, often use virtual addresses as opposed to physical addresses of the system memory. By using virtual addresses, processors can process code and/or data images that are larger than the memory size of the processors' physical memory. To access the code and/or images from system memory, a virtual address is translated, via a translation technique, to a corresponding system memory address. Such a translation technique allows large code and/or images to be processed by processors with different amounts of physical memory, allows each application to be written as if the entire memory belonged to the processor, and allows a multiprocessing system to keep working sets for many programs simultaneously in system memory. While use of virtual addresses reduces circuit complexity, system memory cannot be accessed directly from a virtual address.

To convert a linear address into a physical address for system memory access in an X.86 implementation, paging is used. Paging, in an X86 implementation, produces a linear address by starting with a logical address (segment identifier and offset), and adding the segment base identified by the selector identifier to the segment offset. In essence, paging takes the linear address and uses a portion of the linear address to access a directory table. The retrieved information from the directory table is used to identify a paging table. Having identified the paging table, another portion of the linear address is used to identify a particular entry in the paging table. The retrieved entry from the paging table along with the remainder of the linear address produces the physical address of the system memory.

The retrieved entry from the paging table may be stored in a translation look aside table (TLB). As is known with the X.86 paging technique, the paging function may be enabled or disabled. When disabled, the TLB is not used. However, when the paging is enabled, a TLB entry is generated based on the linear address. In existing implementations of an X.86 processor, the paging function and TLB generation are performed utilizing a state machine. In other types of processors, such as the MIPS processor, software is used to process a portion of the TLB entry.

While existing paging techniques and system memory utilization function well in most applications, they are somewhat restricted in providing flexibility. For example, when an upgrade occurs, hardware typically needs to be replaced, as is the case with an X.86 processor. In addition, one type of processor, such an X.86 processor, generally does not interface with other types of processors, such an MIPS processor. For such processors to communicate, a conversion between an X.86 processing language and MIPS processing language needs to occur.

Therefore, a need exists for a method and apparatus that provides a more flexible utilization and addressing of system memory for processors within a computing system.

DETAILED DESCRIPTION OF A PREFERRED EMBODIMENT

Generally, the present invention provides a method and apparatus for restricting memory access. Such a method and apparatus includes processing that begins by monitoring memory access requests. When the memory access request is from a processor, the processing continues by determining the mode of operation of the processor when one of the memory access requests is requesting access to restricted memory. Note that the mode of operation of the processor may be a system special operation (i.e., operations internal to the operation of the computing system that are beyond access of computing system users and programmers), non-system special, or normal, operations. When the memory access request is from a peripheral device, a determination is made as to whether the request is directed toward the restricted memory. When the mode of operation is non-system special and the memory access is requesting access to restricted memory for processor requests or when the restricted memory is addressed for peripheral device requests, the processing continues by modifying the memory access request. The processing then continues by providing a response in accordance with the modified memory access request. As such, the reserved, or restricted, memory is only accessed for system special operations, such as for X.86 emulation instructions, MIPS emulation instructions, and/or any instructions that relate to the function of the system which is transparent to a user and/or programmer.

Figure 1:
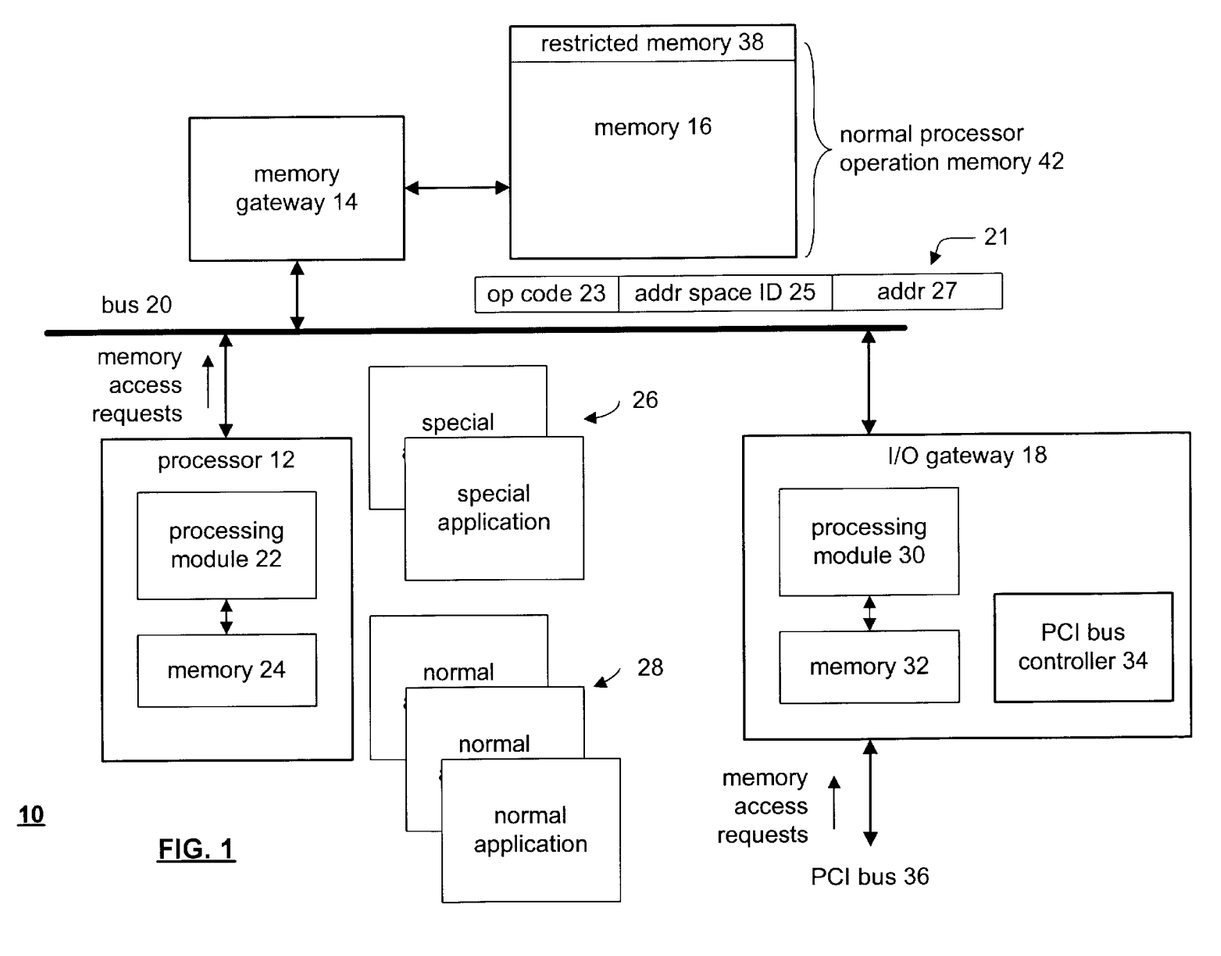
FIG. 1 illustrates a schematic block diagram of a computing system in accordance with the present invention.

The present invention can be more fully described with reference to FIGS. 1 through 9. FIG. 1 illustrates a schematic block diagram of a computing system 10 that includes a processor 12, a memory gateway 14, memory 16, an input/output gateway 18, and a bus 20. The processor 12 includes a processing module 22 and memory 24. Similarly, the IO gateway 18 includes a processing module 30 and memory 32. The processing module 22 or 30 may each be a single processing device, be a single processing device, or a plurality of processing devices. Such a processing device may be a microprocessor, microcontroller, digital signal processor, microcomputer, state machine, logic circuitry, and/or any device that manipulates signals (e.g., analog or digital) based on operational instructions. The memory 24 or 32 may be a single memory device, the same memory device, or a plurality of memory devices. Such a memory device may be a read-only memory, random access memory, floppy disk memory, magnetic tape memory, erasable memory, portion of memory 16, and/or any device that stores operational instructions in a digital format. Note that when the processing module 22 and/or 30 implement one or more of its functions via a state machine or logic circuitry, the memory storing the corresponding operational instructions is embedded within the circuitry comprising the state machine and/or logic circuitry.

Memory 16, which may be system memory, includes a normal processor operation memory section 42 and restricted memory 38. As in existing computer systems, the normal processor operation memory 42 is available to the processor and the peripheral devices for performing applications and other functions. The restricted memory 38 is reserved for special operations of the processor that are to be transparent to programmers and/or users of the computer system 10. Such special applications 26 may be for X.86 emulation, such that the processor 12 functions as an X.86 compliant central processing unit, MIPS operational instructions such that the processor 12 operates as a MIPS compliant processor, or native instructions such that the processor functions as a native processor. A native processor may include proprietary instructions that are not in accordance with an existing standard. As such, the proprietary processor emulation instructions may vary depending on the desired functions of the processor by the processor manufacturer, or computer system manufacturer, in accordance with the present invention.

As shown, the bus 20 supports transaction operational codes 27, which may be provided by the processor 12 while operating in either the normal mode or the special mode or by a peripheral device via the I/O gateway 18. The operational code 27 includes an operational code field 23, an address space identification field 25, and an address field 27. The address space field 25 indicates whether the transaction is to be performed in memory address space or PCI address space. When operating in memory address space, data is written to or read from memory 16 or cache memory. When operating in PCI address space, the CPU is requesting a peripheral device to perform a function. Accordingly, all transactions initiated by a peripheral device will be contained within the memory address space, while transactions initiated by the CPU may be in either memory address space or PCI address space.

The restricted memory 38 is contained within the memory address space, but is above a threshold that indicates a maximum memory address that is available to peripheral devices, via the PCI bus, and to the CPU for normal operations. As such, when a memory request exceeds the threshold, the memory access request is altered, thereby preventing access to the restricted memory 38 for all operations other than special operations of the processor 12. Altering of the memory access request originated by the processor 12 and by peripheral devices will be discussed separately below.

While the processor 12 is performing normal applications 28, it typically utilizes, via the memory gateway 14, the normal processor operation memory 42. The processor 12 also monitors the addresses being generated for the corresponding memory access request to the normal processor operation memory 42. When the memory access request is requesting access to the restricted memory 38, the processor 12 alters the address by changing the address space identification such that it appears as a non-existent memory location (e.g., change the address space to PCI address space in the translation look aside table, which will described in detail below). The altered memory access request is then routed to the I/O gateway 18 via the bus 20. The I/O gateway places the altered memory access request on the PCI bus 36 and processing proceeds to the next operation.

The I/O gateway 18 monitors the memory access request from peripheral devices via the PCI bus 36. Note that the PCI bus 36 is controlled via a PCI bus controller 34 as is known in existing computer architectures. When the I/O gateway 18 determines that a memory access request includes a request to access to the restricted memory 38, it provides a default response. The I/O gateway 18 makes such a determination by comparing the address in the memory access request with an address threshold, which identifies the restricted memory 38. If the comparison indicates that the memory access request is requesting access to the normal memory 42, the memory access request is processed normally. If, however, the memory access request is requesting access to the restricted memory 38, the I/O gateway 18 alters the memory access request. The altering may be done for a read memory access request by converting it to a default data request and default data is provided to the requesting peripheral device. Alternatively, if the memory access request were a write memory access request, the I/O gateway 18 modifies the request to a null request and provides a transaction complete indication is provided to the peripheral device without providing a memory access request to the memory gateway 14.

As such, the processor 12 and/or the IO gateway 18 process memory access requests to prevent unauthorized access to the restricted memory 38 and do so without providing data on the bus or involving the memory gateway 14. As one of average skill in the art would appreciate, an alternate embodiment may be derived by including a processing module (similar to processing module 22 or 30) and memory (similar to memory 24 or 32) within the memory gateway 14. The processing module would execute operational instructions stored in the memory to perform the restriction of access to the restricted memory 38 for both processor requests and peripheral device requests.

Figure 2:
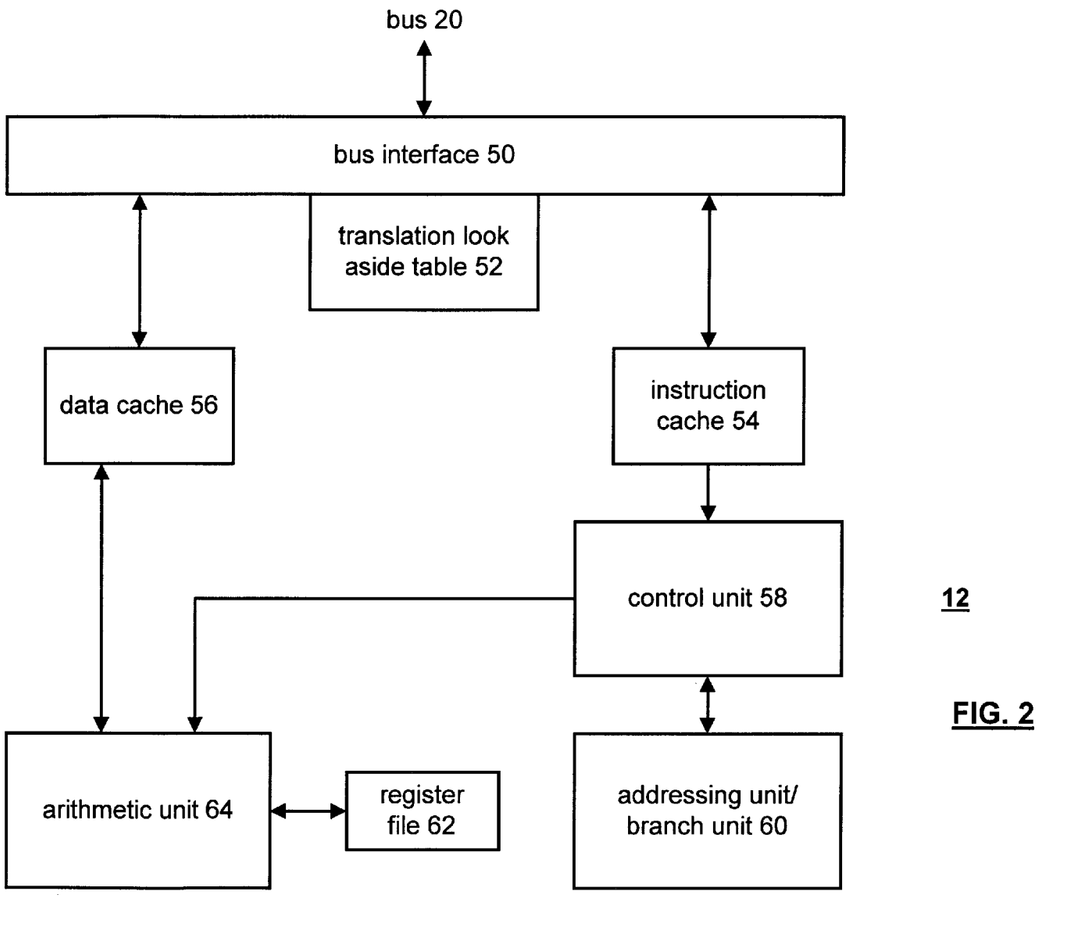
FIG. 2 illustrates a schematic block diagram of the processor of FIG. 1.

FIG. 2 illustrates a schematic block diagram of the processor 12. The processor 12 includes a bus interface 50, a translation look aside table (TLB) 52, a data cache 56, an instruction cache 54, a control unit 58, an addressing unit/branch unit 60, a register file 62 and an arithmetic unit 64. Note that the TLB 52 may include multiple tables, where one or more tables are used for a specific function such as instruction fetch and data references. The arithmetic unit 64 may include a single arithmetic unit or a plurality of arithmetic units. Such an arithmetic unit 64 performs general arithmetic and logic functions, calculates linear addresses for load and store instructions and branch target addresses for registered base branch instructions. In addition, as the addresses are being calculated, the arithmetic unit checks for segment limit violations of the addresses. The arithmetic unit 64 also performs logic functions, shift functions, floating point additions, video functions, floating point multiplications, etc. The particular type of function performed by the arithmetic unit 64 is based on inputs received from control unit 58. The resulting data produced by the arithmetic unit 46 is provided to data cache 56, which in turn is provided to bus 20 via the bus interface 50.

The control unit 58 receives instructions from the instruction cache 54, which are received via bus 20. The control unit 58 causes the instructions to be fetched. When the instructions are received, the control unit 58 decodes, schedules, and issues them to the arithmetic unit 64. The arithmetic unit 64 performs the instructed arithmetic function as previously described.

The branch portion of the addressing unit/branch unit 60 performs branch predictions and miss prediction recoveries. The addressing portion of the addressing unit/branch unit 60 performs many of the known addressing functions of a computing system. In addition, the addressing portion of unit 60 and/or the TLB 52 facilitate memory access requests during normal applications and special applications by storing, in the TLB 52, translated address information that corresponds to a linear address. When the translation address information is stored in the TLB, subsequent memory access requests having the same linear address use the translated address information to access memory. When the TLB does not include an entry for a linear address identified in a memory access request, a TLB miss is generated. In response to the TLB miss, exception handlers, which will be discussed in greater detail with reference to FIG. 4, generate a TLB entry, which is stored in the TLB and, if it is pointing to restricted memory, the address extension is modified such that the address space identifier is pointing to PCI memory space (i.e., the memory access request is altered). Note that the TLB entry may point to DRAM memory space or PCI memory space. The reference is then retried. Further note that this mechanism also allows two entries that have matching linear addresses to be stored in the TLB but have differing address extensions. The modification of an address will be further discussed with reference to FIGS. 3–7.

Figure 3:
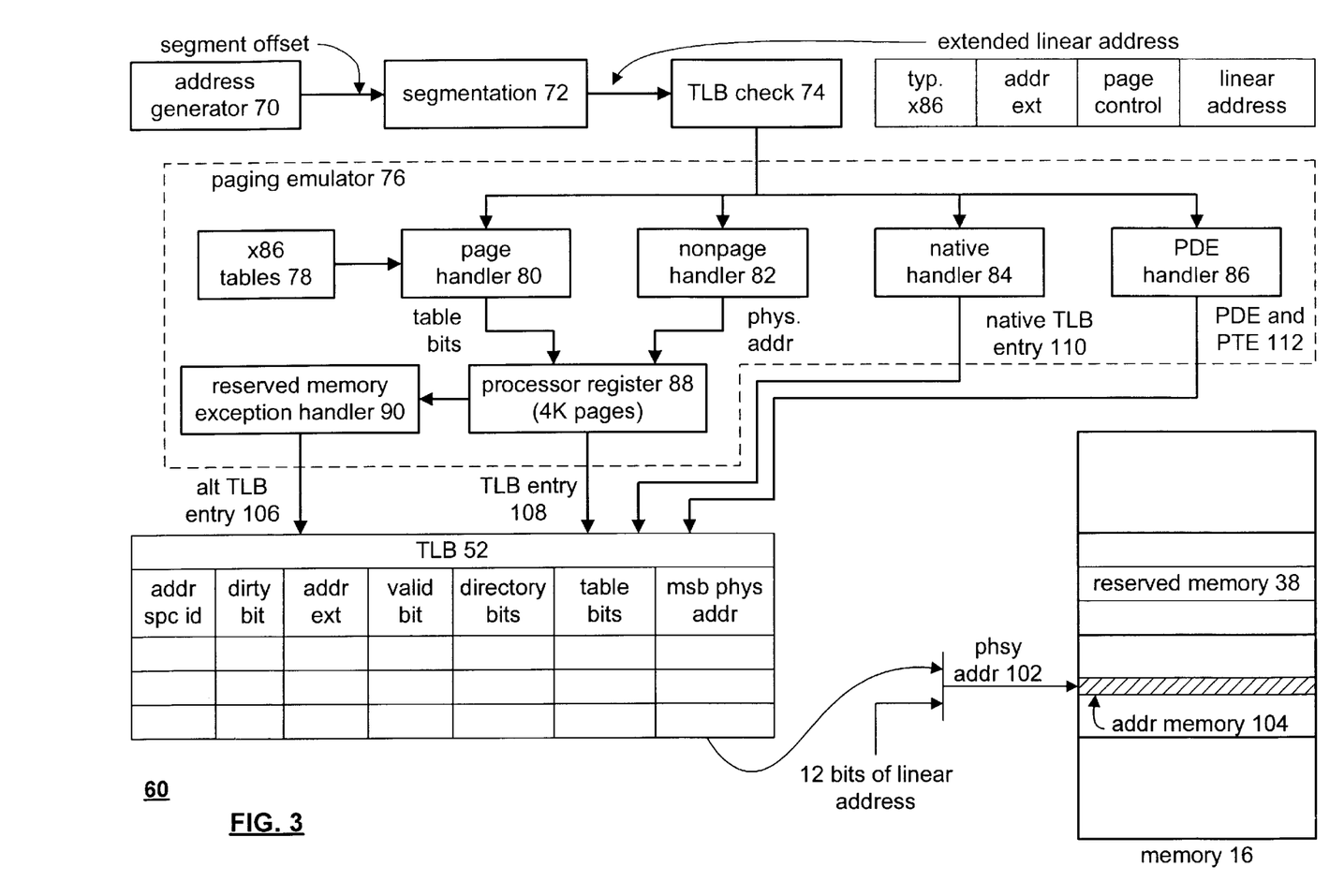
FIG. 3 illustrates a schematic block diagram and operational diagram of the processor of FIG. 1 addressing system memory in accordance with the present invention.

FIG. 3 illustrates a schematic block diagram and graphical operational diagram of the processor 12 interfacing with memory 16. As shown, unit 60 includes an address generation unit 70, a segmentation unit 72, a translation look aside table (TLB) check module 74 and a paging emulator 76. The address generation unit 70, as in a typical computing system, generates a segment offset. The segmentation module 72 receives the segment offset to produce an extended linear address. The extended linear address includes a portion for typical X.86 operation header information (e.g., segment descriptor), an address extension, page control indication, and a linear address. The typical X.86 information is known, thus no further discussion will be provided except to further illustrate the present invention. The page control includes, on a segment by segment basis, an indication as to whether paging will be enabled or disabled. The linear address of the extended linear address is generated in accordance with existing computer architecture protocols to include a directory identifier, a paging table identifier, and a page offset.

The segmentation module 72 also generates the address extension. The address extension identifies which exception handler of the paging emulator 76 is to process the extended linear address. Accordingly, if the processor 12 is in a special mode (e.g., is to process data contained in the reserved memory), the segmentation module 72 indicates, via the address extension, that the native handler 84 is to process the extended linear address and/or the corresponding instruction. In addition, X.86 references are always paged, even when the X.86 is not in a paged mode.

In an embodiment of the present invention, it is desirable to have the page exception handler 80 processing page requests regardless of the page control. Accordingly, the page exception handler 80 generates translation look aside table entries which are processed to ensure that the reserved memory 38 is not accessed other than for special operations.

The paging emulator 76 includes an X.86 table module 78, a page exception handler 80, a non-page exception handler 82, a native exception handler 84 and a page directory entry (PDE) exception handler 86. In general, the exception handlers 80–86 generate a TLB entry when one does not exist for a particular memory access request. The PDE exception handler 86 generates, using known techniques, a page directory entry and a page table entry 112, which are provided to the translation look aside table 52. The PDE exception handler 86 also generates, in accordance with the present invention, an address space identifier, which is stored as part of the TLB entry. The page handler 80 generates table bits from the linear address and data contained in the X.86 tables 78. Such a process is known in existing X.86 processor implementations. The page handler 80 also generates, in accordance with the present invention, an address space identifier. The non-page exception handler 82 generates a physical address from the extended linear address, where the physical address is stored in the TLB 52. The native exception handler 84 generates a translation look aside table entry 110 for native functions, i.e., the special operation mode of the processor functions. As such, when a native exception handler TLB entry is accessed in the TBL, the corresponding memory access request is allowed to access the restricted memory.

The table bits produced by the page exception handler 80 and/or the physical address produced by the non-page handler 82 are provided to a processor register 88 when the pages are arranged in 4K byte increments. The processor register 88 determines whether the table bits or the physical address are accessing reserved memory 38. If so, the register 88 provides the data to the reserved memory exception handler 90, which generates an altered translation look aside table entry 106. As mentioned, the altered TLB entry may be done by changing the address space identifier from memory space to PCI space. If, however, the reserved memory is not being accessed, the data passes from register 88 to the translation look aside table 52 without alteration as TLB entry 108. When the pages are larger than 4K (e.g., 4 M bytes), the page exception handler 80 and the non-page exception handler 82 determine whether the restricted memory is being accessed and alter the TLB entry when the restricted memory is addressed. In an alternate embodiment, a 4M byte TLB entry is produced by hardware instead of the exception handlers.

The translation look aside table 52 includes a field for the dirty bit, the address extension, a valid bit, the more significant bits of the linear address, page attribute information, address space identification, and the most significant bits of the physical address. For a TLB entry match to occur, as determined by the TLB checking module 74, the valid bit must be asserted, the address extension must match, and the most significant bits of the linear address must match.

Memory 16 is shown to include a plurality of segments 96 (four shown). The reserved memory 38 is located in the second segment of memory. The memory is accessed via addresses generated in accordance with an entry in the TLB 52 and a portion of the linear address (e.g., the least significant 12 bits). For example, a physical address 102 of memory is generated based on the 12 bits of the logical address and the most significant bits of the physical address stored in the TLB.

Figure 4:
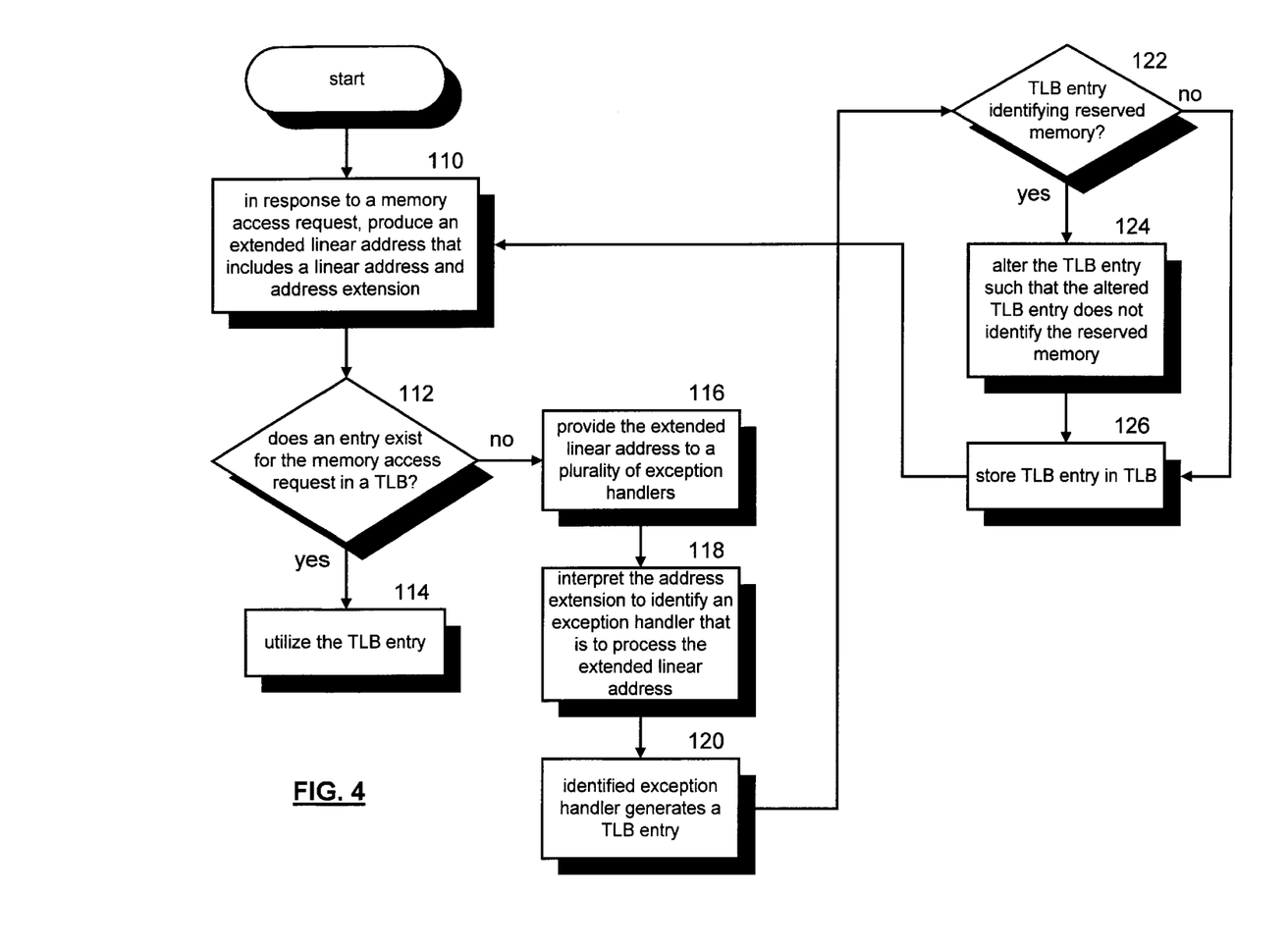
FIG. 4 illustrates a flowchart of a method for address paging emulation in accordance with the present invention.

FIG. 4 illustrates a flowchart of a method for address paging emulation that may be implemented as operation instructions and performed by processor 12. The process begins at step 110, where, in response to a memory access request, an extended linear address that includes a linear address and address extension is produced. The extended linear address may further include a page control that provides a page enable/disable indication for segments of memory. The process then proceeds to step 112 where a determination is made as to whether an entry exists for the memory access request in a translation look aside table. Such a determination may further comprise determining whether an existing entry in the translation look aside table is valid and matches the address extension and linear address of the extended linear address. If so, the process proceeds to step 114 where the existing TLB entry is utilized.

If an entry does not exist in the translation look aside table, and assuming paging is enabled, the process proceeds to step 116. At step 116 the extended linear address is provided to a plurality of exception handlers. The exception handlers include paging exception handler, a non-page exception handler, a native exception handler, and/or a PDE exception handler. The process then proceeds to step 118 where the address extension is interpreted by the exception handlers to identify the extension handler to process the extended linear address. The process then proceeds to step 120 where the identified exception handler generates a TLB entry for the memory access request.

The process then proceeds to step 122 where a determination is made as to whether the TLB entry identifies memory within the reserved memory. If so, the process proceeds to step 124 where the TLB entry is altered such that the TLB entry does not identify the reserved memory. In particular, the TLB entry may be altered so address space identifier is PCI instead of memory. The process then proceeds to step 126 where the altered TLB entry is stored or the newly created TLB entry is stored. The TLB now contains a valid translation and the memory access request is restarted at step 110. Note that if the X86 paging is not enabled, the "no" branch of step 112 would proceed to providing the extended linear address to a non-paging exception handler 82. The nonpaging exception handler would then generate the physical address from the extended linear address without consulting page tables in memory and generate an altered memory access request if appropriate. The generated physical address would then be entered into the TLB. Further note that if the X86 paging is not enabled, the segment descriptor will still indicate that paging is enabled.

Figure 5:
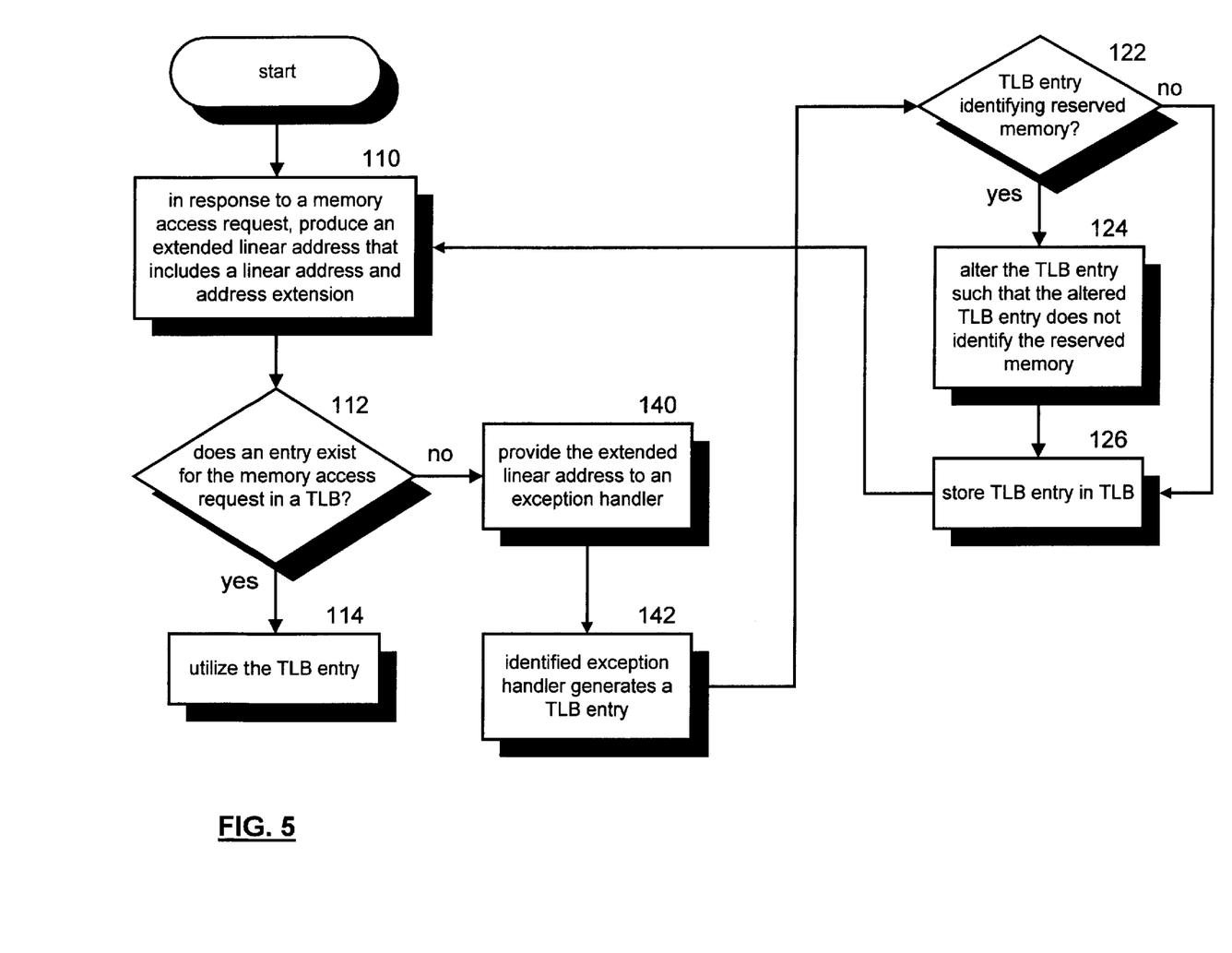
FIG. 5 illustrates a flowchart of an alternate method for address page emulation in accordance with the present invention.

FIG. 5 illustrates a flowchart of an alternate method for address paging emulation that may be performed by processing module 12. The method of FIG. 5 includes many of the same steps as FIG. 4 and begins at step 110 where an extended linear address is generated in response to a memory access request. The process then proceeds to step 112 where a determination is made as to whether an entry exists for the memory access requests in the translation look aside table. If not, the process proceeds to step 140 where the extended linear address is provided to an exception handler, which may be any one of the previously discussed exception handlers that has been identified by a hardware exception vectoring process. Alternatively, the exception handler may be a single exception handler that performs equivalent functions as the plurality of previously discussed exception handlers. The exception handler generates a TLB entry based on the linear address and the address extension. As such, a single exception handler processes the extended linear address. The process then proceeds to steps 122 through 130, which were previously discussed.

Figure 6:
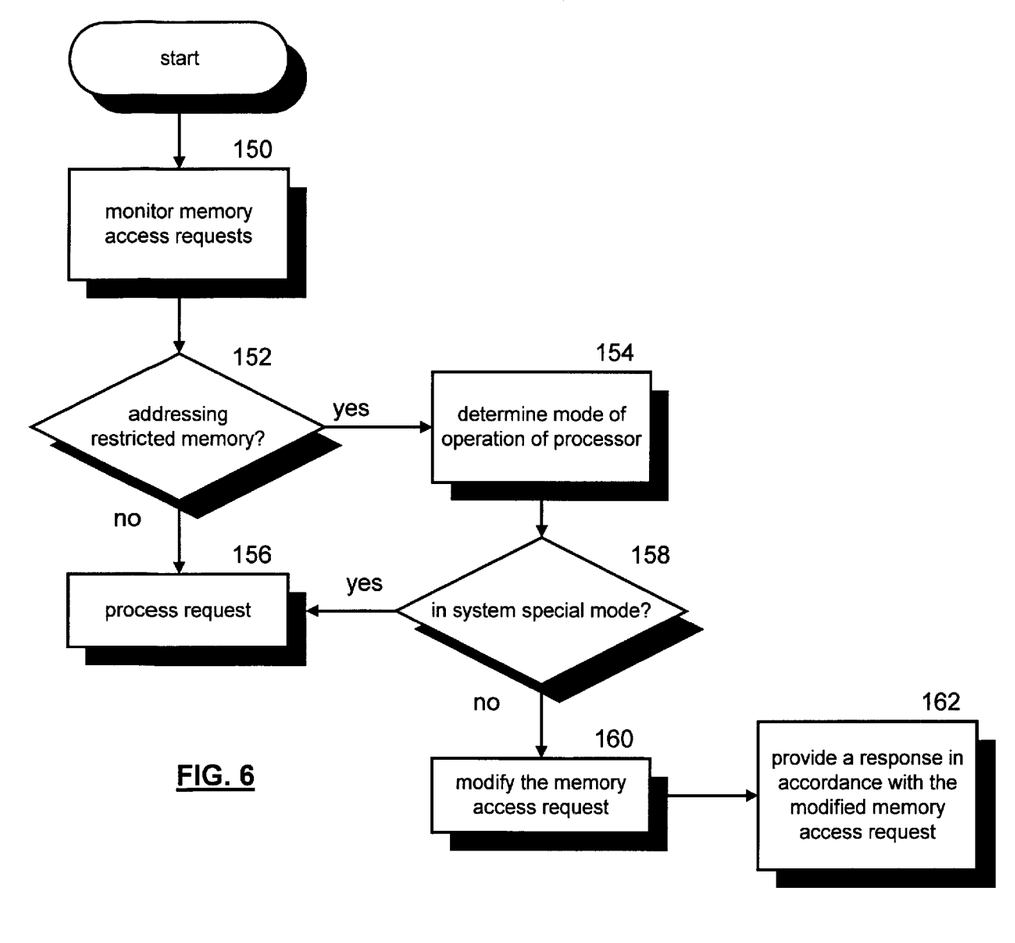
FIG. 6 illustrates a flowchart of a method for restricting memory access in accordance with the present invention.

FIG. 6 illustrates a flowchart of a method for restricting memory access that may be implemented as operational instructions that are performed by processing module 12. The process begins at step 150 where system special and at least some normal memory access requests are monitored. A system special memory access request is generated by the processor when it is performing an operation that is internal to the system (i.e., not alterable by a system user or system designer). A normal memory request is any other type of request by the processor. The process then proceeds to step 152 where a determination is made as to whether the memory access request is requesting access to restricted memory. If not, the process proceeds to step 156 where the memory access request is processed.

If however, the memory access request is requesting access to the restricted memory, the process proceeds to step 154. At step 154, the mode of operation of the processor is determined. Note that the mode of operation may be set to special or normal based on information in a special mode field of the extended logical address, or may be based on memory access requests that indicate that the native exception handler is to process the request. As discussed, the indication is contained within the address extension of the extended linear address. The process then proceeds to step 158, where a determination is made as to whether the process is in the special mode. If so, the process proceeds to step 156, where the memory access request is processed. Note that when the processing mode is in a system special mode, the memory accesses request is processed by the native exception handler, which creates a TLB entry enabling accessing to the restricted memory. Recall that a special mode of operation generally relates to system level functions, such as X.86 emulation, MIPS emulation, proprietary processor emulation, and/or any system level function that is to be transparent to a computer system user or programmer.

If the process is in the normal mode, the process proceeds to step 160 where the memory access request is modified. The modification may be done by altering the address space identifier of the translation look aside table entry. The process then proceeds to step 162 where a response is provided in accordance with the modified memory access request. In general, the response will be providing the altered memory access request on the PCI bus.

Figure 7:
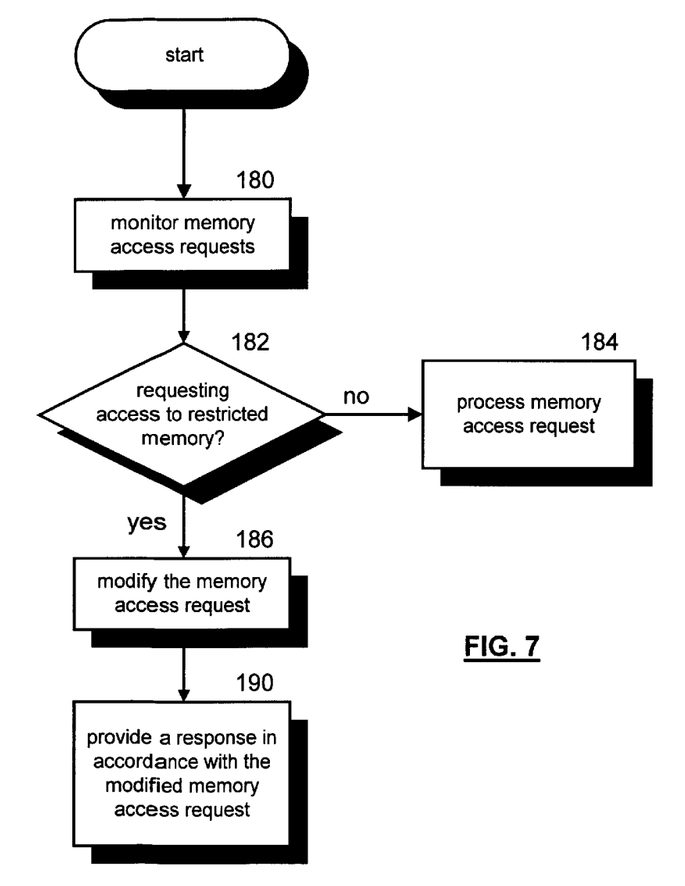
FIG. 7 illustrates a flowchart of an alternate method for restricting memory access in accordance with the present invention.

FIG. 7 illustrates a flowchart of an alternate method for restricting memory access, which may be performed by PCI bus controller 34 and/or processing module 30. The process begins at step 180 where memory access requests are monitored. Such requests are monitored when they are provided by a peripheral device via the PCI bus. The process then proceeds to step 182 where a determination is made as to whether an access request is requesting access to restrictive memory. If not, the process proceeds to step 184 where the memory access request is processed without alteration.

If, however, the memory access request is requesting access to the restrictive memory, the process proceeds to step 186 where the memory access request is modified. The process then proceeds to step 190 where a response is provided in accordance with the modified memory access request. As such, when the memory request was to read data, the processing steps of 164 and 166 are performed. At step 164 a read memory access request is modified to a default data request. The process then proceeds to step 166 where default data is provided to the requesting entity (e.g., the processor or a peripheral device). If the memory request were to write data the processing steps of 168 and 170 are performed. At step 168 a write memory access request is modified to a no request. The process then proceeds to step 170 where a transaction complete indication is provided to the requesting entity.

The preceding discussion has presented a method and apparatus for restricting memory access and providing a flexible paging technique. As one of average skill in the art would appreciate, other embodiments may be derived from the teachings of present invention without deviating from the scope of the claims or the spirit of the invention.

What is claimed is:

1. A method for address paging emulation, the method comprises the steps of:
   a) producing an extended logical address in response to a memory access request, wherein the extended logical address includes a logical address and an address extension;
   b) determining, based on the logical address, whether an entry exists for the memory access request in a translation look aside table;
   c) when an entry does not exist for the memory access request in the translation look aside table, providing the extended logical address to a plurality of exception handlers;
   d) identifying one of the plurality of exception handlers to process the extended logical address; and
   e) generating, by the one of the plurality of exception handlers, a translation look aside table entry for the memory access request, wherein said one of the plurality of exception handlers determines whether the translation look aside table entry identifies reserved memory, and when the translation look aside table entry identifies the reserved memory, alters, when the memory access request is not a system special operation, the translation look aside table entry to produce a modified translation look aside table entry that is not identifying the reserved memory.

2. The method of claim 1 further comprises, subsequent to generating the translation look aside table entry,
   re-producing the extended logical address; and
   retrieving a physical address from the translation look aside table based on the translation look aside table entry.

3. The method of claim 2 further comprises, subsequent to generating the translation look aside table entry,
   re-producing the extended logical address; and
   retrieving the physical address from the translation look aside table.

4. The method of claim 1 further comprises generating, by the one of the plurality of exception handlers, a physical address for the memory access request and storing the physical address in an entry of the translation look aside table.

5. The method of claim 1, wherein the plurality of exception handlers includes at least two of: a page exception handler, a non-page exception handler, a native exception handler, and a PDE exception handler.

6. The method of claim 1, wherein the extended logical address further comprises a page control, wherein the page control includes page enable/disable for segments of memory.

7. The method of claim 1, wherein step (b) further comprises determining whether an existing entry in the translation look aside table is valid and matches the address extension and the logical address of the extended logical address.

8. The method of claim 7 further comprises, subsequent to generating the translation look aside table entry,
   re-producing the extended logical address; and
   retrieving a physical address from the translation look aside table based on the translation look aside table entry.

9. The method of claim 7, wherein the translation look aside table entry is one of a TLB entry or physical address.

10. The method of claim 7, wherein the extended logical address further comprises a page control, wherein the page control includes page enable/disable for segments of memory.

11. The method of claim 7, wherein step (b) further comprises determining whether an existing entry in the translation look aside table is valid and matches the address extension and the logical address of the extended logical address.

12. The address paging emulator of claim 11, wherein the memory further comprises operational instructions that cause the processing module to, subsequent to generating the translation look aside table entry,
   re-produce the extended logical address; and
   retrieve a physical address from the translation look aside table based on the translation look aside table entry.

13. The address paging emulator of claim 12, wherein the memory further comprises operational instructions that cause the processing module to, subsequent to generating the translation look aside table entry,
   re-produce the extended logical address; and
   retrieve the physical address from the translation look aside table.

14. The address paging emulator of claim 13, wherein the memory further comprises operational instructions that cause the processing module to, subsequent to generating the translation look aside table entry,
   re-produce the extended logical address; and
   retrieve a physical address from the translation look aside table based on the translation look aside table entry.

15. The address paging emulator of claim 13, wherein the memory further comprises operational instructions that cause the processing module to determine whether an existing entry in the translation look aside table is valid and matches the address extension and the logical address of the extended logical address.

16. The address paging emulator of claim 11, wherein the memory further comprises operational instructions that cause the processing module to generate, as the one of the plurality of exception handlers, a physical address for the memory access request and to store the physical address in an entry of the translation look aside table.

17. A method for address paging emulation, the method comprises the steps of:
   a) producing an extended logical address in response to a memory access request, wherein the extended logical address includes a logical address and an address extension;
   b) determining, based on the logical address, whether an entry exists for the memory access request in a translation look aside table;
   c) when an entry does not exist for the memory access request in the translation look aside table, providing the extended logical address to an exception handler; and d) generating, by the exception handler, a translation look aside table entry for the memory access request, wherein said exception handler determines whether the translation look aside table entry identifies reserved memory, and when the translation look aside table entry identifies the reserved memory, alters, when the memory access request is not a system special operation, the translation look aside table entry to produce a modified translation look aside table entry that is not identifying the reserved memory.

18. An address paging emulator comprises:

a processing module; and memory operably coupled to the processing module, wherein the memory stores operational instructions that cause the processing module to (a) produce an extended logical address in response to a memory access request, wherein the extended logical address includes a logical address and an address extension; (b) determine, based on the logical address, whether an entry exists for the memory access request in a translation look aside table; (c) providing the extended logical address to a plurality of exception handlers when an entry does not exist for the memory access request in the translation look aside table; (d) identify one of the plurality of exception handlers to process the extended logical address; (e) generate, as the one of the plurality of exception handlers, a translation look aside table entry for the memory access request; (f) determine whether the translation look aside table entry is identifying reserved memory; and (g) alter, when the memory access request is not a system special operation, the translation look aside table entry to produce a modified translation look aside table entry that is not identifying the reserved memory when the translation look aside table entry is identifying the reserved memory.

19. An address paging emulator comprises:

a processing module; and memory operably coupled to the processing module, wherein the memory stores operational instructions that cause the processing module to (a) produce an extended logical address in response to a memory access request, wherein the extended logical address includes a logical address and an address extension; (b) determine, based on the logical address, whether an entry exists for the memory access request in a translation look aside table; (c) generate a translation look aside table entry for the memory access request when an entry does not exist for the memory access request in the translation look aside table; (d) determine whether the translation look aside table entry is identifying reserved memory; and (e) alter, when the memory access request is not a system special operation, the translation look aside table entry to produce a modified translation look aside table entry that is not identifying the reserved memory when the translation look aside table entry is identifying the reserved memory.

* * * * *